United States Patent [19]
Presley

[11] 3,824,956
[45] July 23, 1974

[54] FISH BROODER OR REFUGE

[76] Inventor: Robert W. Presley, R.F.D. No. 1, Makanda, Ill. 62958

[22] Filed: June 22, 1973

[21] Appl. No.: 372,619

[52] U.S. Cl. .............................................. 119/3
[51] Int. Cl. .......................................... A01k 61/00
[58] Field of Search ........................................ 119/3

[56] References Cited
UNITED STATES PATENTS

| | | | |
|---|---|---|---|
| 742,414 | 10/1903 | Hale | 119/3 X |
| 742,415 | 10/1903 | Hale | 119/3 X |

*Primary Examiner*—Hugh R. Chamblee
*Attorney, Agent, or Firm*—Brady, O'Boyle & Gates

[57] ABSTRACT

An open-ended cylinder body has partial end closures to allow the formation of a gravel bed up to a predetermined level with the cylinder body resting on its side. Anchoring legs for the cylinder body may be provided as permanently attached strap elements or separately formed attachable spring legs. The brooder may be constructed in various lengths from a basic unit.

6 Claims, 5 Drawing Figures

PATENTED JUL 23 1974  3,824,956

FISH BROODER OR REFUGE

BACKGROUND OF THE INVENTION

The need for artificial fish refuges has been recognized as an essential element to promote the development of fish resources. Insufficient brooder or refuge areas occur in nature to promote the multiplication of fish at desirable rates and hence the need arises for practical and economic means to provide artificial brooders.

The prior patented art discloses some devices for this purpose and an example is U.S. Pat. No. 3,561,402 showing an artificial refuge reef particularly for use in coastal waters for the promotion of coastal fisheries.

The objective of this invention is to provide an improved brooder or refuge for fish which is characterized by extreme simplicity and economy of manufacturing. Additionally, the brooder embodies a basic module or unit which may be employed alone or in association with one or more companion units to build a fish refuge of substantially any desired length. While the refuge embodying the invention is ideally suited for relatively shallow lakes, it may in principle be utilized in other water areas.

The basic brooder unit has a body portion in the form of an open-ended cylinder which allows advantageously the use of discarded can bodies or the like for the construction of brooders thus keeping the cost of materials to an absolute minimum. However, the body portion of the brooder may, if desired, be formed of other materials including certain plastics, fiberglass, or metal treated with a rust-resistant coating.

The cylinder body portion of the brooder is equipped with a simplified system of anchoring and support legs which may be permanently attached to the body portion or formed separately therefrom as attachment parts. Partial end closures for the open-ended cylinder body allow the formation of a gravel bed in the brooder up to any desired level without impeding access to the brooder at either end.

Other objects and advantages of the invention will become apparent during the course of the following description.

DESCRIPTION OF DRAWING FIGURES

DETAILED DESCRIPTION

Figure 1:
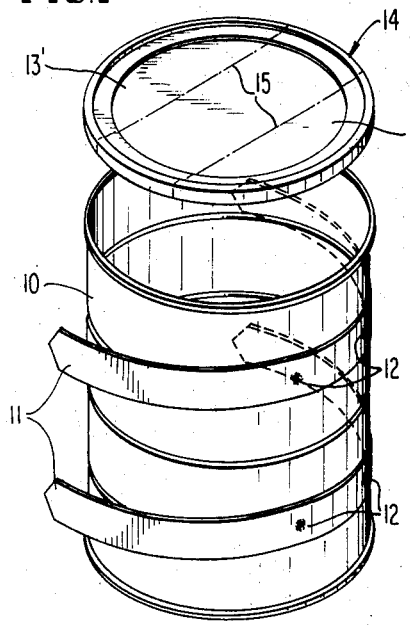
FIG. 1 is an exploded perspective view showing the components of the brooder prior to installation for use at the bottom of a body of water.
Figure 2:
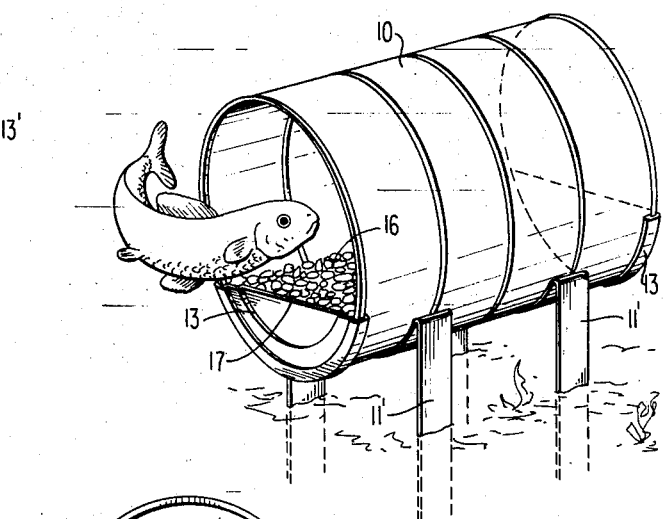
FIG. 2 is a perspective view of the brooder or refuge in a use position.
Figure 3:
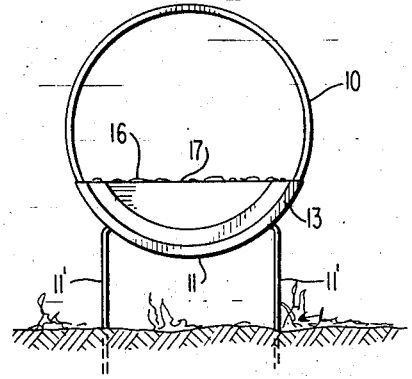
FIG. 3 is an end elevational view of the brooder as depicted in FIG. 2.

Referring to the drawings in detail wherein like numerals designate like parts, reference is made initially to FIGS. 1 through 3 showing one preferred embodiment of the invention. In these figures, the numeral 10 designates an open-ended cylinder body or sleeve which may be advantageously formed from a discarded can, such as a coffee can or the like. However, depending upon the size and the particular utilization of the brooder, materials other than can bodies may be employed as required and may be custom fabricated from plastics, fiberglass or metal treated to resist corrosion in whatever size is required to meet the needs of a particular situation.

In any event, the cylinder body 10 has its opposite ends open either in the initial formation of the device or by the removal of the can bottom and lid where a food can or the like is employed.

For anchoring and supporting the cylinder body on its side at the bottom of a lake, FIG. 2, metal straps 11 may be spot welded as at 12 to the cylinder body side wall so as to be secured permanently around a substantial arcuate portion of the side wall. The straps 11 may then be bent away from the cylinder body at their opposite ends to form pairs of parallel dependent anchor legs indicated at 11' in FIG. 2, and which legs are simply embedded in the soil bottom of a lake or the like to anchor the brooder for use.

Each end of the open-ended cylinder body 10 is equipped with a partial closure 13 conveniently formed from a segment 13', FIG. 1, cut along spaced parallel lines 15 from a plastic can lid 14. This plastic lid 14 is employed to keep the contents of the can fresh following the removal of its main lid. This auxiliary lid arrangement is customary on certain food cans such as coffee cans which may be employed for making the brooder. In other cases, the partial end closures 13 may be produced from any desirable materials and secured in place with epoxy cement or some equivalent means. The partial end closures 13 allow the formation of a gravel bed 16 in the lower portion of the cylinder body extending between the ends thereof and up to a desirable level determined by the level of the straight horizontal edge 17 of the partial end closure 13. The remainder of the brooder above the gravel bed 16 is entirely open at each end so that the fish will have easy access at each end.

Figure 4:
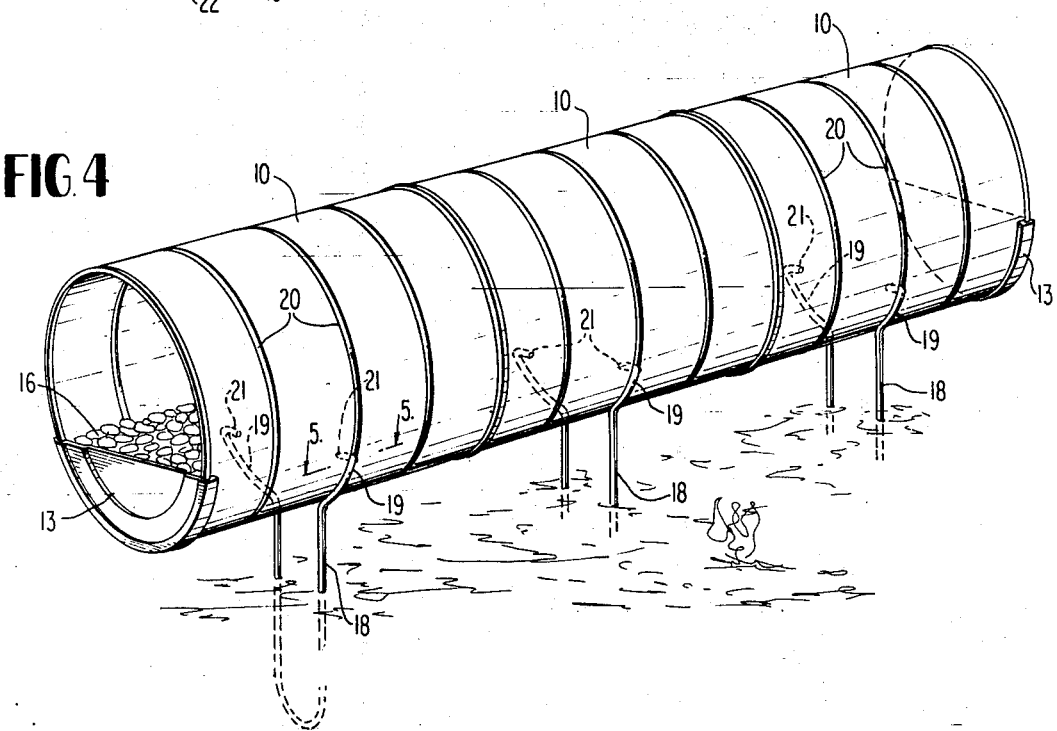
FIG. 4 is a perspective view of a brooder in expanded form and employing a modified form of anchor leg.

FIG. 4 of the drawings illustrates how several of the basic cylinder bodies 10 may be utilized in assembled relationship end-to-end to form an elongated brooder or refuge for certain species of fish. The particular brooder shown in FIG. 4 employs three of the open-ended cylinder bodies 10 secured together in end-to-end relation by epoxy cement, soldering or welding. The ends of the cylindrical brooder thus formed are equipped with the same partial closures 13, previously described, to allow the formation of the gravel bed 16 in which the fish lay their eggs.

Figure 5:
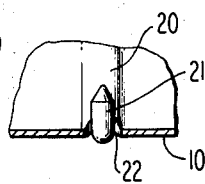
FIG. 5 is an enlarged fragmentary cross section taken on line 5—5 of FIG. 4.

FIGS. 4 and 5 additionally show a modified leg structure for the brooder comprising a generally U-shaped spring leg portion 18 whose upper arm portions are formed at 19 to conform to the curvature of the body 10 and to lie within annular grooves 20 which are found on certain coffee cans or the like. The tips 21 of the curved leg portions 19 enter apertures 22, FIG. 5, formed in the cylinder body 10 on opposite sides thereof. The tips 21 will remain engaged within the apertures 22 by the spring tension in the legs 18. FIG. 4 illustrates that three of the leg units 18 will suffice to support a brooder constructed from three of the cylinder bodies 10. With the legs 18 utilized to support a single cylinder body 10 in a short brooder such as the one illustrated in FIG. 2, then a pair of the spring legs would be employed in spaced relation and positioned similarly to the legs 11'.

It should now be evident that the invention provides for the formation of a very satisfactory brooder for fish from economical materials. Also, the invention possesses flexibility or versatility in that the level of the gravel bed 16 may be regulated in accordance with the location of the closure edge 17, and the length of the brooder assembly may be customized to accommodate various types of fish merely by adding on one or more of the basic units embodied in the cylinder body 10.

For examples of the usage of the invention, a 6½ inch can measuring 6 inches in diameter is suitable as a spawning bed for Bluegills or similar pan fish. The addition of a second section or module 10 would enable the device to accommodate Bass, and a three unit assembly such as shown in FIG. 4 would be ideal for Channel Catfish. It is thought that the numerous features and advantages of the invention over the prior art will now be apparent to anyone skilled in the art in view of the foregoing specification.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A fish brooder or refuge comprising a tubular body portion adapted to be positioned on its side in a substantially level position during use, partial end closures for said body portion extending to a predetermined elevation above the bottom of the body portion during use to allow filling of the body portion with gravel or the like up to a predetermined level, and supporting and anchoring legs connected to the periphery of the tubular body portion and adapted to penetrate the bottom soil beneath a body of water to render said tubular body portion stationary.

2. The structure of claim 1, wherein said legs comprise strap elements permanently attached to the periphery of the body portion with the ends of the strap elements bent to form pairs of substantially parallel dependent legs.

3. The structure of claim 1, and said body portion being cylindrical, and said partial end closures comprising segments of circular closures having straight substantially horizontal retaining edges at their tops, the elevations of said edges determining the depth of a gravel bed in the brooder or refuge.

4. The structure of claim 1, in which each leg comprising a generally U-shaped portion for penetration into the soil and having sides which are tensioned inwardly toward each other, the tops of said sides having inwardly directed tips, and said body portion being apertured to receive said inwardly directed tips.

5. The structure of claim 4, and said body portion having annular grooves, and said leg sides having arcuate extensions near their tops and below said tips seated in said grooves.

6. The structure of claim 1, wherein said legs are generally U-shaped spring elements having inwardly directed tips at their tops which are urged together by spring tension, said body portion being apertured on opposite sides to receive said tips.

* * * * *